Figure 1:
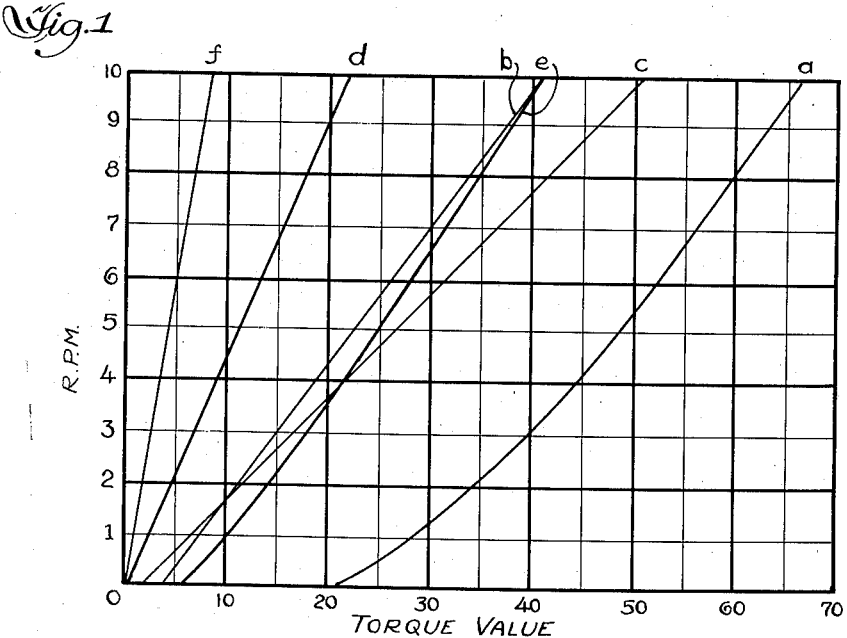

Nov. 27, 1962

M. J. SHOEMAKER 3,066,038

PLASTIC LIQUID PROTECTIVE COATINGS

Filed Sept. 2, 1958

Inventor,
Milton J. Shoemaker,
By: Jones, Darbo & Robertson,
Attys.

United States Patent Office 3,066,038
Patented Nov. 27, 1962

3,066,038
PLASTIC LIQUID PROTECTIVE COATINGS
Milton J. Shoemaker, Madison, Wis., assignor to Research Products Corporation, Madison, Wis.
Filed Sept. 2, 1958, Ser. No. 758,468
21 Claims. (Cl. 106—224)

This invention relates to improved drying vehicles suitable for coatings and to methods for their manufacture. More particularly, the invention relates to paint and varnish compositions having improved resistance to run and sag that are prepared by thickening a vehicle containing a binder to a non-Newtonian plastic consistency with a solid ethylene polymer.

In the application of paints and varnishes, the tendency of the film to excessive flow under the influence of gravity is referred to in the industry as curtaining, run or sag. When a paint or varnish is so thick that brush marks persist, or there is too much "pull" or "drag" on the brush, the painter invariably adds sufficient thinner to eliminate or minimize this defect. He is then confronted by run and sag, especially on vertical or overhead surfaces. Virtually all varnishes and many paints sag, particularly when thinned to a brushable consistency. In these circumstances, it is necessary to limit the thickness of the coat and this usually results in extra work and cost. Application by roller coating and spray coating is also subject to the limitations imposed by the tendency of the coat to run and sag.

The numerous methods which have been employed by the industry to minimize run and sag of paints and varnishes are eloquent testimony to the importance with which the problem is regarded. Probably the oldest method of reducing run in paints is that of simply adding an excess of pigment, or, as is more commonly the case, of adding a filler mineral in addition to the pigment required for adequate covering power. The addition of more pigment or mineral than required for covering power is often reflected in greater density, increased tendency to settle and cake in containers and in reduction in gloss and durability of the dry coat. It also increases the "pull" or "drag" on the brush which is due to increasing the apparent viscosity at the high rate of sheer incident to brushing. Another expedient which is employed, but which is not very effective and which is also harmful to durability, is the liming of drying oils. Various metal soaps have been used, especially in England, although they are not very effective, and paints and varnishes to which these have been added suffer from instability in storage and are limited to flat and semi-gloss finishes. Small amounts of water, as well as soaps, have been added but this detracts from quality and is again not very effective.

The so-called high viscosity alkyds have been used to a limited extent in flat and semi-gloss interior finishes, but have the disadvantage of objectionable "pull" or "drag" on the brush. Polyamide resins reacted with drying oils or alkyds have been employed to produce paints with resistance to run and sag, but have the disadvantages of requiring a relatively high concentration and of imparting highly thixotropic characteristics whereby the apparent viscosity may vary fairly rapidly over a wide range. Another limitation is the reactivity of these resins with certain pigments such as zinc oxide and the instability of such finishes under moist conditions usually incidental to exterior use.

It has now been found and is the main object of this invention that paint and varnish compositions possessing high resistance to run and sag with little increase in resistance to brushing may be prepared by thickening the vehicle with a low molecular weight ethylene polymer.

A further object of the invention is the production of paint compositions which are highly resistant to the settling out of pigments and the caking thereof on storage.

It is a further object of this invention to provide paint and varnish compositions which, while exhibiting tenacity to surfaces to which they may be applied, have reduced penetration into new wood, wallboard or other absorptive surfaces. As a result, the coverage is extended on such surfaces and brushing facilitated.

Yet another object of the invention is the production of coating compositions exhibiting enhanced toughness and resistance to rupture by denting, flexing or other distortion.

Still other advantages accrue in improved resistance of the coatings to moisture and weathering.

Another important aim of the invention is to accomplish the above objects with a minimum reduction in the gloss of the finished coatings.

In carrying out the invention, the polymer of ethylene is usually dispersed directly in the vehicle but, if desired, the ethylene polymer may be dispersed in a paint or varnish or in the drying oil or liquid resin solution used therein.

The ethylene polymers which are suitable for carrying out the objects of the invention exhibit melt viscosities in the range of 125 to about 4000 cps. at 120° to 140° C., and possess molecular weights of 1000 to 6000 Staudinger. The lower molecular weight polymers, and especially the linear polymers, are preferred. In order to be effective for the purposes of the invention, the ethylene polymer is preliminarily dissolved in the liquid coating composition or liquid components thereof at elevated temperatures followed by cooling under controlled conditions to impart "plastic liquid" or "Bingham body" characteristics. (Encyclopedia of Chemical Technology, The Interscience Cyclopedia, Inc., New York (1953), p. 739.) As used in this reference and herein, a plastic liquid, when considered in relation to a rather soft plastic body (Bingham body) is one which exhibits no flow until a given stress, called the yield value, is reached; thereafter, it flows like a normal liquid. It has been discovered that the objects of the invention may be achieved by controlling the concentration and type of ethylene polymer and the molecular cooling rate through the critical cooling temperature range. Molecular cooling refers to cooling in situ in relatively thin layers in contrast to cooling en masse by chilling the walls of the containing vessel.

Since the ethylene polymers differ in their response to controlled cooling, as reflected in the yield value of the liquid coating composition, the composition to be employed will depend to a certain extent on the peculiar properties of the polymer chosen. In general, 1% or less by weight may be sufficient, although in particular cases 2% to 3% or more may be more desirable.

The molecular cooling rate, by which is meant the approximate cooling rate of an extremely thin film of the coating liquid containing the polymer dissolved therein, in contrast to the mass cooling rate is critical as will be shown in the examples. Ordinary cooling rates of less than 3° C. per minute are not very effective in thickening the paint and varnish compositions to the plastic consistency necessary to prevent run and sag.

As a hot solution of a coating liquid containing the ethylene polymer dissolved therein is cooled, a temperature is reached where the polymer begins to emerge from true solution to form a colloidal solution exhibiting the typical Tyndall effect in the absence of pigments or other materials which in themselves impart opacity. This temperature is termed the critical temperature. The commercial ethylene polymers as obtained on the market, are believed to be blends of a number of polymers which vary somewhat in molecular weight and structure, and it is believed these differences account, at least in part, for the observed fact that the change from the true solution to the colloidal solution takes place throughout a temperature range, termed the critical temperature range. Any cooling which occurs above or below this range has little or no effect on the products of this invention.

The following examples, which are illustrative only, will serve to more clearly explain the invention. In these examples, the Brookfield viscometer, Model HAF, has been employed as the most practical instrument to show the yield value in plastic liquid paints and varnishes. To further standardize the procedure for comparative purposes, the zero to 100 scale was used and either the No. 1 spindle or, where it was necessary to use other spindles, the results converted to No. 1 spindle readings. All solutions being measured were maintained at a temperature of about 26° C., a temperature at which protective coatings are commonly used.

The yield value, as obtained by means of this instrument, is the torque value obtained by extrapolation of the stress (scale)-r.p.m. curve to zero r.p.m. It represents the least stress in terms of torque required to initiate flow. The presence of a yield value indicates a plastic liquid or Bingham body. Throughout the specification and claims wherever a yield value is referred to, it is to be considered as having been determined by means of a Brookfield viscometer, Model HAF, under the conditions outlined above.

Figure 2:
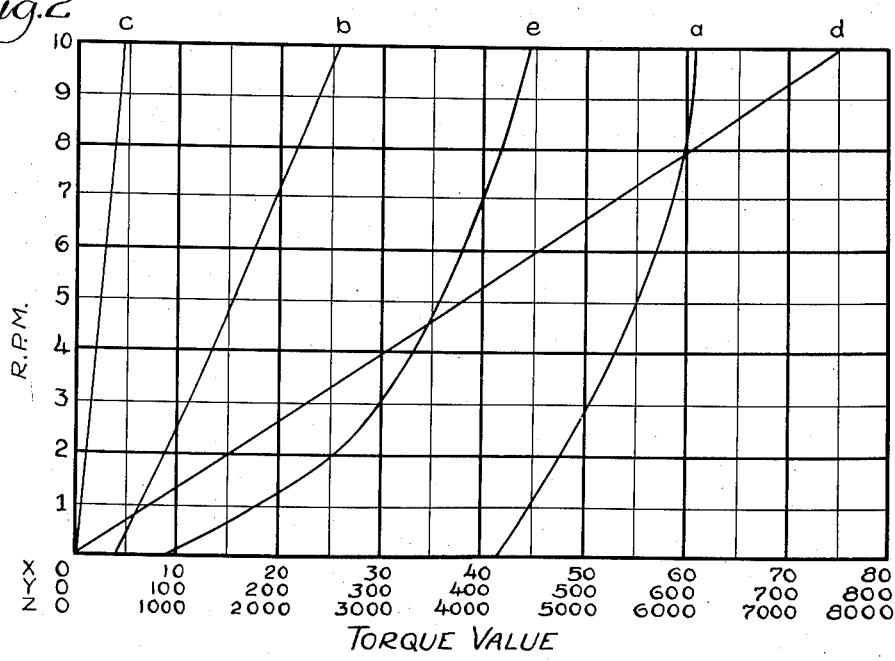

The data obtained in the following examples are further illustrated by the drawing in which:

FIG. 1 is a graph of the results obtained in Example 1 and listed in Table No. 3, and FIG. 2 is a chart of the results obtained from Example 2 and listed below in Table No. 4.

By critically testing a number of paints and varnishes, I have observed that the yield value is an excellent measure of the resistance to run and sag and for convenience, I have classified the values, as shown in Table No. 1.

TABLE NO. 1

| Resistance to Run and Sag | Yield Value | |
|---|---|---|
| | Varnish | Paint |
| Poor | 0–1 | 0–10 |
| Fair | 2–4 | 11–15 |
| Good | 5–10 | 16–20 |
| Excellent | Over 10 | Over 20 |

The yield values listed under paint will be observed to be higher than those under varnish. This is believed to be due to the fact that paints invariably have a much higher specific gravity than varnish.

I have also observed that from the results obtained with the Brookfield viscometer an excellent measure of the resistance to brushing may be readily calculated. This value I have termed "brush index." It is the reciprocal of the slope of the torque-r.p.m. curb between 8 and 10 r.p.m. times 100 when the torque values are plotted as abscissae. For convenient reference, I have classified the brush index as follows.

TABLE NO. 2

Brush characteristics: Brush index
No brush marking, or practically none __ 0–500
Trace of brush marking _____ 500–1000
Noticeable brush marking _____ 1000–1600
Bad brush marking _____ Over 1700

By means of the yield values and the brush index, I have found it practical to classify paints and varnishes.

*Example 1*

A commercial polyethylene wax of the linear type having average molecular weight of 1200 Staudinger and a melt viscosity of 140 cps. at 140° C., was added in an amount sufficient to have the concentrations indicated in a commercial varnish composed of 45% by weight of a soya-phthalic-pentaerythritol alkyd resin, 5% driers and 50% volatile thinners.

The polyethylene wax and the varnish were heated to 115° C., and held there for about 10 minutes during which time the composition was stirred and the polyethylene wax dissolved. It was then observed that upon slowly cooling a portion, the transition temperature, which is herein defined as the temperature at which the ethylene polymers begin to change from the solute to a colloidal dispersion, was about 85° C., and as the temperature dropped was substantially complete at 60° C., or slightly higher.

Portions of the composition, (a) to (f) inclusive, were separately cooled as indicated.

(a) contained 0.75% by weight of the ethylene polymer and was subjected to a molecular cooling rate of approximately 350° C./minute from 90° to 55° whereupon it was allowed to cool to room temperature.

(b) contained 0.75% by weight of the ethylene polymer and was processed as (a) except that the molecular cooling rate of 350° C./minute was initiated at 80° C.

(c) contained 0.75% by weight of the ethylene polymer and was processed as in (a) except that the molecular cooling rate was approximately 15°/minute from 90° to 55°.

(d) contains 0.75% by weight of the ethylene polymer and was processed as in (c) except that cooling was accomplished in a ½ pint can wrapped with paper tissue, and cooling from 90° C. to 55° C. was at the rate of 1.4° per minute.

(e) contained 0.5% by weight of the ethylene polymer and was cooled as in (a) above.

These preparations, together with a sample of varnish as it appears on the market (f) were then tested with the Brookfield viscometer at 26° C.

The torque values on the zero to 100 scale for No. 1 Spindle are given for the r.p.m. in Table No. 3, and shown graphically in FIG. No. 1. In the graph shown in the figure, the r.p.m. of the spindle are shown as the ordinates and the torque values in terms of the No. 1 spindle are shown as the abscissae. The intercept at zero r.p.m. indicating what is herein termed the yield value was obtained by extrapolating each curve obtained from the data in Table 3 for the viscosities at 1, 2, 5, and 10 r.p.m. The brush index was also determined from these results, in the manner described above.

TABLE NO. 3

| | R.p.m. | | | | Yield Value | Brush Index |
|---|---|---|---|---|---|---|
| | 10 | 5 | 2 | 1 | | |
| (a) | 67.6 | 48 | 34.4 | 28 | 22 | 392 |
| (b) | 40.9 | 22.7 | 10.8 | 7.2 | 3.9 | 364 |
| (c) | 50.9 | 26.8 | 11.7 | 7.0 | 2.1 | 482 |
| (d) | 22.1 | 10.5 | 4.2 | 2.15 | 0.25 | 232 |
| (e) | 40.7 | 25.0 | 14.05 | 10.1 | 5.9 | 314 |
| (f) | 8.5 | 4.2 | 1.7 | .9 | 0 | 86 |

Referring to the Tables Nos. 1 and 3, it will be observed that composition (a) has "excellent" resistance to run and sag, (b) has "fair" resistance, (c) has scarcely "fair" resistance while (d) has "poor" resistance, (e) has "good" resistance and (f) has no resistance. In each case, the brush index is in an acceptable range.

It is of interest to note that since the yield value of 22 under (a) in Table No. 3, for 350° C./minute, is higher than necessary for satisfactory resistance to run and sag, the concentration of the ethylene polymers could be reduced to a value below 0.75% by weight and still show a satisfactory product. This has been done in (e). Reduction in the cooling rate would reduce the resistance to run and sag as shown, but if not carried too far could still result in an "excellent" product. The gloss of the dry film of (a) is somewhat duller than that of (e) which, in turn, is somewhat duller than (f).

(b) Demonstrates that, unless cooling is initiated at a temperature of transition whereat the ethylene polymers begin to change from true solution to a colloidal dispersion, the beneficial effects of cooling are minimized and may be defeated. Accordingly, (b) could be improved to an "excellent" resistance rating by raising the temperature at which the cooling is initiated or by increasing the concentration of the ethylene polymers.

In the case of (c), which possesses a torque value of 2.1 at zero r.p.m. and exhibits only "fair" resistance to run and sag, it would be possible to achieve "excellent" resistance by either increasing the cooling rate or the concentration of the polymers of ethylene.

The poor result for resistance to run and sag, as well as the duller film obtained in (d), illustrates the unsatisfactory consequence of ordinary cooling en masse. In this case, the period of cooling from 90° to 55° was 25 minutes. (e) Illustrates that for this particular varnish and polymer of ethylene, 0.5% of the polymer is about the minimum which will impart satisfactory resistance to run and sag, as reflected in the yield value.

The lack of any yield value in (f) is typical of most varnishes on the market and indicates no resistance to run and sag. Most varnishes are characteristic Newtonian liquids and do not exhibit the yield value associated with a plastic liquid or Bingham body.

*Example 2*

A commercial ethylene polymer having a molecular weight of 2000 Staudinger and a melt viscosity of 220 cps. at 140° C., was added to refined linseed oil in an amount sufficient for a concentration of 5% by weight. The ethylene polymer was dissolved in the oil by heating and stirring for about 10 minutes at 112° C. Upon slowly cooling a portion it was observed that the transition temperature, as shown by the first cloudiness which appeared, was approximtaely 98° C.

A portion of the composition (a) was subjected to molecular cooling at a rate of about 350° C./minute from 105° C. to 50° C., and then allowed to cool to room temperature. A portion of (b) was cooled en masse in a container at about 3° C./minute from 105° C. to room temperature. (c) represents the untreated refined linseed oil. (d) represents a commercial heat bodied linseed oil made by heating at about 290° C. (e) represents a composition of 15% by weight of the ethylene polymer in the bodied linseed oil molecularly cooled at about 350° C./minute.

These compositions were then tested with the Brookfield viscometer at 27° C. with the No. 1 spindle and the torque values on the zero to 100 scale recorded in Table No. 4.

TABLE NO. 4

|     | R.p.m. |     |     |     | Yield Value | Brush Index |
| --- | --- | --- | --- | --- | --- | --- |
|     | 10 | 5 | 2 | 1 |     |     |
| (a) | 610 | 540 | 476 | 448 | 420 | 1,400 |
| (b) | .26 | 16 | 9.2 | 6.4 | 3.5 | 200 |
| (c) | 4.5 | 2.3 | 1.0 | .5 | 0 | 44 |
| (d) | .75 | 37.5 | 15 | 7.5 | 0 | 700 |
| (e) | 4,400 | 3,600 | 2,600 | 1,740 | 950 | 16,000 |

The Brookfield readings are graphically shown in FIGURE 2. In the graph shown in this figure, three different scales are used for the torque value in order that all the curves might be adequately shown within the area of the graph. The curves (b), (c) and (d) utilize the 0–80 or X scale. Curve (a) utilizes the 0–800 or Y scale, and curve (e) utilizes the 0–8000 or Z scale. The yield value was determined by extrapolating each curve to zero r.p.m. and the brush index was determined as described above. In the figures, the r.p.m. of the spindle are shown as the ordinates and the torque values in terms of the No. 1 spindle are shown as the abscissae.

It will be noted that both refined linseed oil (c) and the heat-bodied linseed oil (d) are Newtonian liquids as indicated by the passage of the stress-strain curves through the origin. (a) illustrates the advantage obtainable by a high molecular cooling rate. Both the yield value and the brush index are excessive for a finished product, but in this case, the composition may be greatly thinned, if desired, for direct application, or used as a part of the oil to be incorporated in a varnish or paint in order to impart a desirable resistance to run and sag without having excessive resistance to brushing.

(b) illustrates the result of cooling en masse at a rate of 3° C./minute and shows that the resistance to run and sag, as evidenced by the yield values, is less than 1% of what it could have been in an otherwise identical composition prepared by rapid cooling.

(e) illustrates the advantage of incorporating an ethylene polymer when cooled rapidly in bodied linseed oil. From the foregoing, it is apparent that the yield value and brush index are much too high for direct application, but by the use of this composition to replace a portion of the bodied linseed oil ordinarily used in paint and varnish, liquid coatings are obtainable with improved resistance to run and sag and with a minimum flatting effect.

*Example 3*

The bodied linseed oil containing the ethylene polymer and cooled, as reported in Example 2, was employed to improve the yield value in an interior white gloss enamel (a) of the following composition:

| | Parts by weight |
| --- | --- |
| Titanium dioxide (anastase) | 15.1 |
| Precipitated calcium carbonate | 26.6 |
| Pentaerythritol ester gum | 13.2 |
| Bodied linseed oil containing 15% polymer of ethylene | 5.15 |
| Bodied linseed oil | 16.62 |
| Driers | 1.5 |
| Mineral spirits | 22.6 |

The ethylene polymer in the above composition amounted to 0.77%. A similar composition of interior white gloss enamel (b) was prepared containing no ethylene polymer.

Both enamels were tested with the Brookfield viscometer at 26° C., with the No. 1 spindle using the zero–100 scale, as shown in Table No. 5.

TABLE NO. 5

|     | R.p.m. |     |     |     | Yield Value | Brush Index |
| --- | --- | --- | --- | --- | --- | --- |
|     | 10 | 5 | 2 | 1 |     |     |
| (a) | 90 | 70 | 53 | 43.5 | 32 | 400 |
| (b) | 72 | 45 | 25 | 17 | 8.6 | 540 |

The yield value of 8.6 shown for (b) indicates poor resistance to run and sag, as illustrated by the data for paint in Table No. 2. (a) shows the benefit of incorporating the 0.77% of the ethylene polymer cooled rapidly in a portion of the bodied linseed oil employed. It is also of interest to note that there was practically no noticeable difference in the gloss of (a) and (b). Furthermore, when the two liquid compositions were aged in sealed cans on the shelf for six months, (b) settled and caked so badly that it was very difficult to stir it to a homogeneous condition, whereas (a) exhibited very little settling and could readily be stirred to a homogeneous condition. The brush index of both (a) and (b) are satisfactory.

*Example 4*

A commercial ethylene polymer having a molecular weight of 2000 Staudinger and a melt viscosity of 220 cps. at 140° C., was added to the extent of 2.6% of its weight to a commercial high gloss white alkyd enamel having the following formula:

| | Percent by weight |
|---|---|
| Titanium dioxide | 27.7 |
| Zinc oxide | 2.5 |
| Alkyd varnish | 54.5 |
| Drier | 2.0 |
| Mineral spirits | 13.3 |

The ethylene polymer was dissolved by heating and stirring it in the enamel at 112° C. for about 10 minutes. A sample (a) was subjected to molecular cooling at the rate of about 350° C. per minute. A portion of (a) was blended with sufficient untreated enamel to have a concentration of 1.1% ethylene polymer. This was then thinned with 17½% of its weight of mineral spirits to form (b). (c) represents the untreated commercial enamel. Brookfield tests on these preparations at 25° C. are shown in Table No. 6.

TABLE NO. 6

| | R.p.m. | | | | Yield Value | Brush Index |
|---|---|---|---|---|---|---|
| | 10 | 5 | 2 | 1 | | |
| (a) | 546 | 414 | 316 | 264 | 200 | 2,640 |
| (b) | 42 | 34 | 27 | 24 | 20 | 160 |
| (c) | 52 | 35 | 21 | 16 | 10 | 340 |

In the table, it may be seen that the enamel (c), as received, has a yield value of only 10, indicating run and sag which condition was also experimentally confirmed. (a) has an excessive brush index and left bad brush marking. (b) shows that by reducing the concentration of the ethylene polymer and thinning, an excellent product was obtained which did not run and sag and, moreover, left no brush marks and was very easy to brush. The gloss of the dried film of (b) was substantially the same as that of (c).

When painted on bare wood panels, it was observed that it was readily possible to cover a much larger area with the same amount of paint (b) than could be covered with (c). Subsequently, examination of the resulting panels showed that the penetration of (b) into the wood was less than that of (c), although both films were securely anchored. Upon aging, it was also observed that upon denting the painted panels with a blunt instrument the film of (b) was more flexible and showed greater resistance to rupture by denting.

*Example 5*

Polyethylene DYST a product of the Bakelite Division of Union Carbide Corporation having an average molecular weight of 7,000, a softening point of about 95° C., and a viscosity of 1080 cps., at 140° C., was dissolved in linseed oil in the same manner and proportions as in Example 2 above and shock cooled. The polyethylene substantially separated from the linseed oil upon cooling and imparted substantially no thickening effect. It was unsuitable for use in the preparation of the protective coatings according to the present invention.

*Example 6*

Epolene C, a polyethylene product of Eastman Chemical Corporation, having a molecular weight of 8,000, and a melt viscosity of 9,000 cps., at 140° C. was dissolved in linseed oil as in Example 5 above and shock cooled. Here again the polyethylene separated from the linseed oil upon cooling and was inoperative as a thickener.

The ethylene polymers suitable are those having a molecular weight of from 1,000 to 6,000 Staudinger and melt viscosity of 125 to 4000 cps. at 120° to 140° table contains a listing of several suitable commercial products, and indicates their physical properties.

TABLE NO. 7

| Polyethylene | Softening or Melting Point, °C. | Viscosity, Cps. | Mol. Wt., Staudinger | Sp. Gr. |
|---|---|---|---|---|
| A-C No. 6 | 97 to 102 | 180 at 140° C | 2,000 | 0.92 |
| A-C No. 7 | 102 to 106 | 220 at 140° C | 2,000 | 0.92 |
| A-C No. 629 | 96 to 100 | | | |
| A-C No. 615 | 102 to 104 | 4,000 at 140° C | 5,000 | 0.92 |
| Epolene N | 106 | 1,900 to 2,000 at 140° C. | 2,000 to 6,000 | |
| Hostalen | 116.5 to 117 | 31.8 at 140° C | 1,200 | 0.94 |

The molecular cooling rate used to impart the desired properties may vary over a wide range. Where a large amount of the ethlene polymer is incorporated into the vehicle or protective coating, cooling rates of as low as 3° C. per minute improve the yield point materially. For better results, and especially where a small percentage of ethylene polymer such as .5 to .75% is used, a cooling rate above 15° C. and especially rates as high as 350° C. per minute are desirable.

I claim:
1. In a method for the production of a plastic liquid coating composition resistant to run and sag the steps which comprise preparing a solution of an ethylene polymer having a molecular weight of 1000–6000 Staudinger and a melt viscosity of 125 to 4000 cps. within a temperature range of from 120° to 140° C. in a liquid component of said coating composition at a temperature greater than the transition temperature, said liquid component including a material selected from the group consisting of a drying oil and of a liquid comprised of a resinous binder dissolved in an organic solvent, and thereafter cooling the resulting solution through a substantial portion of the transition temperature range at a rate sufficient to impart plastic liquid properties thereto.

2. In a method for the production of a plastic liquid coating composition resistant to run and sag, the steps which comprise preparing a solution containing at least 0.5% by weight of an ethylene polymer having a molecular weight of 1000–6000 Staudinger and a melt viscosity of 125 to 4000 cps. within a temperature range of from 120° to 140° C. in a liquid component of said coating composition at a temperature greater than the transition temperature, said liquid component including a material selected from the group consisting of a drying oil and of a liquid comprised of a resinous binder dissolved in an organic solvent, and thereafter cooling the resulting solution through a substantial portion of the transition temperature range at a rate sufficient to impart plastic liquid properties thereto.

3. A method according to claim 2 wherein said liquid component is a coating vehicle comprised of a solvent and a binder.

4. A method according to claim 2 wherein said liquid component is a drying oil of the linseed oil type.

5. A method for improving the resistance to run and sag of a coating composition comprised of a resinous binder dissolved in an organic solvent which comprises preparing a solution of at least 0.5% by weight of an ethylene polymer having a molecular weight of 1000 to 6000 Staudinger and a melt viscosity of 125 to 4000 cps. within a temperature range of from 120° to 140° C. in said coating composition at a temperature greater than the transition temperature, and cooling the resulting solution through a substantial portion of the transition temperature range at a rate sufficient to impart plastic liquid properties thereto.

6. In a method for the production of a plastic liquid coating composition resistant to run and sag, the steps which comprise preparing a solution containing 0.5% by weight of an ethylene polymer having a molecular weight of 1000–6000 Staudinger and a melt viscosity of 125 to 4000 cps. within a temperature range of from 120° to 140° C. in a liquid component of said coating composition at a temperature greater than the transition temperature, said liquid component including a material selected from the group consisting of a drying oil and of a liquid comprised of a resinous binder dissolved in an organic solvent, and thereafter cooling the resulting solution through a substantial portion of the transition temperature range at a rate of at least 3° C. per minute.

7. In a method for the production of a plastic liquid coating composition resistant to run and sag the steps which comprise preparing a solution of an ethylene polymer having a molecular weight of 1000–6000 Staudinger and a melt viscosity of 125 to 4000 cps. within a temperature range of from 120° to 140° C. in a liquid component of said coating composition at a temperature greater than the transition temperature, said liquid component including a material selected from the group consisting of a drying oil and of a liquid comprised of a resinous binder dissolved in an organic solvent, and thereafter cooling the resulting solution through a substantial portion of the transition temperature range at a rate of at least 15° C. per minute.

8. In a method for increasing the yield value of a coating composition, the steps which comprise preparing a solution of an ethylene polymer having a molecular weight of 1000 to 6000 Staudinger and a melt viscosity of 125 to 4000 cps. within a temperature range of from 120° to 140° C. in a liquid component of said coating composition at a temperature greater than the transition temperature, said liquid component including a material selected from the group consisting of a drying oil and of a liquid comprised of a resinous binder dissolved in an organic solvent, and thereafter cooling the resulting solution through a substantial portion of the transition temperature range at a rate sufficient to raise the yield value of said solution to at least 4.

9. A method for the production of a liquid component suitable for formulation of plastic liquid coating compositions resistant to run and sag, said liquid component including a material selected from the group consisting of a drying oil and of a liquid comprised of a resinous binder dissolved in an organic solvent, which comprises preparing a solution of at least 0.5% by weight of an ethylene polymer having a molecular weight of 1000 to 6000 Staudinger and a melt viscosity of 125 to 4000 cps. within a temperature range of from 120° to 140° C. in said liquid component at a temperature greater than the transition temperature, and cooling the resulting solution through a substantial portion of the transition temperature range at a rate sufficient to impart plastic liquid properties thereto.

10. A method for the production of a liquid vehicle comprised of a resinous binder dissolved in an organic solvent suitable for use in formulating plastic liquid coating compositions resistant to run and sag which comprises preparing a solution of at least 0.5% by weight of an ethylene polymer having a molecular weight of 1000 to 6000 Staudinger and a melt viscosity of 125 to 4000 cps. within a temperature range of from 120° to 140° C. in said vehicle at a temperature greater than the transition temperature, and cooling the resulting solution through a substantial portion of the transistion temperature range at a rate sufficient to impart plastic liquid properties thereto.

11. A method for the production of a plastic liquid drying oil suitable for the formulation of coating compositions resistant to run and sag which comprises preparing a solution of at least 0.5% by weight of an ethylene polymer having a molecular weight of 1000 to 6000 Staudinger and a melt viscosity of 125 to 4000 cps. within a temperature range of from 120° to 140° C. in a drying oil of the linseed oil type at a temperature greater than the transition temperature, and cooling the resulting solution through a substantial portion of the transition temperature range at a rate sufficient to impart plastic liquid properties thereto.

12. A plastic liquid coating composition resistant to run and sag comprising an ethylene polymer having a molecular weight of 1000 to 6000 Staudinger and a melt viscosity of 125 to 4000 cps. within a temperature range of from 120° to 140° C., said polymer being present in the form resulting from dissolution of the polymer in a liquid component of said coating composition at a temperature greater than the transition temperature, said liquid component including a material selected from the group consisting of a drying oil and of a liquid comprised of a resinous binder dissolved in an organic solvent, and subsequent cooling of said solution through a substantial portion of the transition temperature range at a rate sufficient to impart plastic liquid properties thereto.

13. A plastic liquid coating composition resistant to run and sag, said liquid component including a material selected from the group consisting of a drying oil and of a liquid comprised of a resinous binder dissolved in an organic solvent, comprising at least 0.5% by weight of an ethylene polymer having a molecular weight of 1000 to 6000 Staudinger and a melt viscosity of 125 to 4000 cps. within the temperature range of 120° to 140° C., said polymer being present in the form resulting from dissolution of the polymer in a liquid component of said coating composition at a temperature greater than the transition temperature and subsequent cooling of said solution through a substantial portion of the transition temperature range at a rate sufficient to impart plastic liquid properties thereto.

14. A coating composition according to claim 13 wherein said liquid component is a drying oil of the linseed oil type.

15. A coating composition according to claim 13 wherein said liquid component is a coating composition vehicle comprised of a resinous binder dissolved in an organic solvent.

16. A liquid component suitable for formulating plastic liquid coating compositions resistant to run and sag, said liquid component including a material selected from the group consisting of a drying oil and of a liquid comprised of a resinous binder dissolved in an organic solvent, comprising at least 0.5% by weight of an ethylene polymer having a molecular weight of 1000 to 6000 Staudinger and a melt viscosity of 125 to 4000 cps. within a temperature range of from 120° to 140° C. said polymer being present in the form resulting from dissolution of the polymer in said component at a temperature greater than the transition temperature, and subsequent cooling of said solution through a substantial portion of the transition temperature range at a rate sufficient to impart plastic liquid properties thereto.

17. A drying oil of the linseed oil type suitable for formulating plastic liquid coating compositions resistant to run and sag comprising at least 0.5% by weight of an ethylene polymer having a molecular weight of 1000 to 6000 Staudinger and a melt viscosity of 125 to 4000 cps. within a temperature range of from 120° to 140° C., said polymer being present in the form resulting from dissolution of the polymer in said drying oil at a temperature greater than the transition temperature, and subsequent cooling of said solution through a substantial portion of the transition temperature range at a rate sufficent to impart plastic liquid properties thereto.

18. A vehicle suitable for formulating coating compositions resistant to run and sag comprising at least 0.5% by weight of an ethylene polymer having a molecular weight of from 1000 to 6000 Staudinger and a melt viscosity of 125 to 4000 cps. within a temperature range of from 120° to 140° C., said polymer being present in the form resulting from dissolution of the polymer in said vehicle at a temperature greater than the transition temperature, said vehicle including a material selected from the group consisting of a drying oil and of a liquid comprised of a resinous binder dissolved in an organic solvent, and subsequent cooling of said solution through a substantial portion of the transition temperature range at a rate sufficient to impart plastic liquid properties thereto.

19. A plastic liquid coating composition resistant to run and sag comprising at least 0.5% by weight of an ethylene polymer having a molecular weight of from 1000 to 6000 Staudinger and a melt viscosity of 125 to 4000 cps. within a temperature range of from 120° to 140° C., said polymer being present in the form resulting from dissolution of the polymer in a liquid component of said coating composition at a temperature greater than the transition temperature, said liquid component including a material selected from the group consisting of a drying oil and of a liquid comprised of a resinous binder dissolved in an organic solvent, and subsequent cooling of said solution through a substantial portion of the transition temperature range at a rate sufficient to impart a yield value of at least 4 thereto.

20. A plastic liquid coating composition resistant to run and sag comprising at least 0.5% by weight of an ethylene polymer having a molecular weight of 1000 to 6000 Staudinger and a melt viscosity of 125 to 4000 cps. within a temperature range of from 120° to 140° C., said polymer being present in the form resulting from dissolution of the polymer in a liquid component of said coating composition at a temperature greater than the transition temperature, said liquid component including a material selected from the group consisting of a drying oil and of a liquid comprised of a resinous binder dissolved in an organic solvent, and subsequent cooling of said solution through a substantial portion of the transition temperature range at a rate of at least 3° C. per minute.

21. A coating composition resistant to run and sag comprising at least 0.5% by weight of an ethylene polymer having a molecular weight of 1000 to 6000 Staudinger and a melt viscosity of 125 to 4000 cps. within a temperature range of from 120° to 140° C., said polymer being present in the form resulting from dissolution of the polymer in a liquid component of said coating composition at a temperature greater than the transition temperature, said liquid component including a material selected from the group consisting of a drying oil and of a liquid comprised of a resinous binder dissolved in an organic solvent, and subsequent cooling of said solution through a substantial portion of the transition temperature range at a rate of at least 15° C. per minute.

References Cited in the file of this patent

UNITED STATES PATENTS

| | | |
|---|---|---|
| 2,472,680 | Pratt | June 7, 1949 |
| 2,518,462 | Gowing et al. | Aug. 15, 1950 |
| 2,558,053 | Lee | June 26, 1951 |
| 2,886,551 | McNulty et al. | May 12, 1959 |
| 2,928,797 | Brunson et al. | Mar. 15, 1960 |